Figure 1:
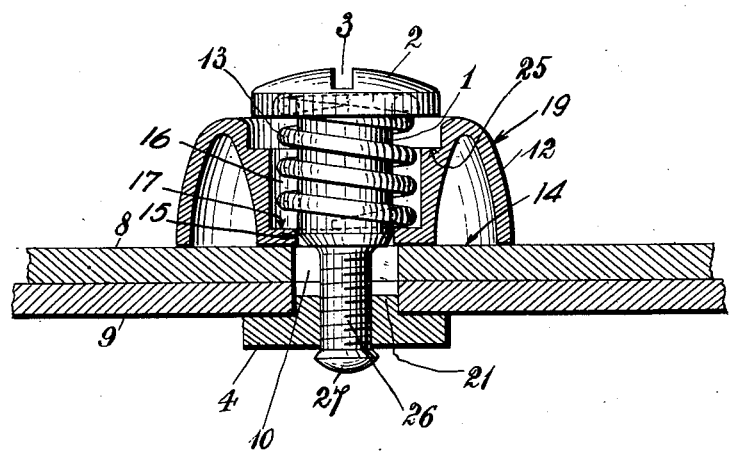

May 30, 1933.   W. H. J. FITZGERALD   1,911,820
FASTENING DEVICE
Filed Aug. 9, 1929

INVENTOR:
William H. J. Fitzgerald
BY John E. R. Hayes
ATTORNEYS

Patented May 30, 1933

1,911,820

UNITED STATES PATENT OFFICE

WILLIAM H. J. FITZGERALD, OF BRAINTREE, MASSACHUSETTS, ASSIGNOR TO KATCHES, INC., OF BOSTON, MASSACHUSETTS, A CORPORATION OF MASSACHUSETTS

FASTENING DEVICE

Application filed August 9, 1929. Serial No. 384,561.

The invention relates to an improvement in that type of fastening device comprising a shank having at one end a head by which the shank may be turned, and with which is usually associated a spring arranged on the shank beneath the head, and at its opposite end a crossbar. The device is used for fastening together several associated parts by passing the shank with attached cross-bar through aligned apertures in the several parts, entrance being first had through the aperture in the outer part. The passage of the shank through the apertures of the several parts is continued until the head, or spring associated with it, has drawing engagement with the face of the outer one of the combined parts and the crossbar on the end of the shank has passed beyond the aperture in the inner one of the combined parts, after which the fastening is completed by the turning of the shank through application of power to the head of the fastening with the effect of turning the crossbar on the inner end of the shank crosswise across the aperture in the inner one of the combined parts which completes the fastening.

The object of the invention is to obtain an improved fastening device of the same general character and mode of operation as that above described by fitting it with means for accomplishing any one or all of the following advantages.

To provide means whereby the shank of the fastening device may be maintained in a relatively fixed vertical position with relation to the parts to be combined, both upon its initial application to the parts and during its passage through the several apertures in them. The preferred embodiment of the fastening is one in which the head on the outer end of the shank is like the head of a screw and is provided with a slot by which the head may be driven or turned by a driving instrument. It is to be desired that the shank and head of the fastening be maintained in a proper upright position at all times so that it may be conveniently driven and afterward turned by the driving instrument, and this especially in cases where a powerful spring is employed which requires considerable force to distort it; to provide a fastening device in which the spring is socketed and concealed; to provide a fastening device presenting when applied a finished appearance and in which the head of the device is socketed; to provide a fastening device in which the crossbar on the end of the shank will become locked in place after it has been turned crosswise the opening or aperture in the inner one of the combined parts so that the fastening cannot become accidentally unfastened without some positive action being taken to effect its unfastening; and to provide a fastening device in which the draft of a screw or threaded connection may be employed to exert draft or pressure for securely binding together the combined parts after the fastening is in place; in other words, to provide means whereby after the fastening is once made, to then further complete the fastening by making the head and crossbar on the ends of the shank, operating as draft member, to nearer approach one another and thereby exert pressure to securely bind together the combined parts, and this through the force or influence exerted by a threaded connection.

The invention can best be seen and understood by reference to the drawing in which—

Figure 2:
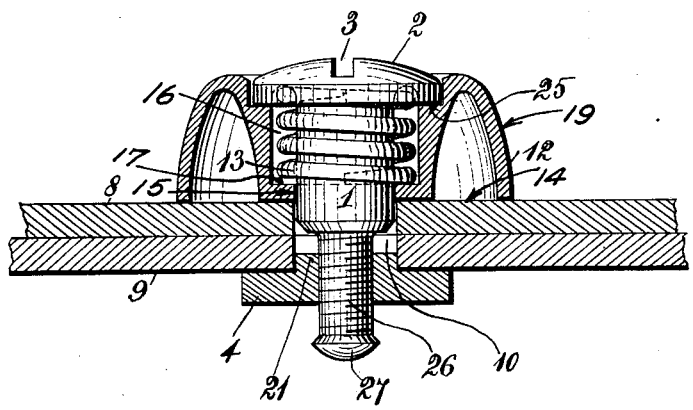

Figure 1 shows in cross section one embodiment of the improved fastening device in place in the initial position occupied by it for fastening together separate members or parts, and Figure 2 is a cross section substantially the same as Fig. 1 except that the position of certain of the parts have become changed for obtaining the complete fastening.

Referring to the drawing:—

1 represents the shank of the fastening device. This shank is preferably cylindrical in form and its length depends upon the number and thickness of the parts to be fastened together by the device. The shank is made of as sturdy structure as possible. 2 represents the head on the end of the shank. This is preferably a rounded head formed integral with the shank. The head is substantially like the head of a screw and is provided with a slot 3 in its outer side or face by which it and the shank may be turned. At its opposite end the shank is provided with a crossbar 4. This bar is preferably rectangular in form. 8 and 9 represent parts or objects to be combined and fastened together by the fastening device. These parts are each provided with openings or apertures 10 through them which are of sufficient size to permit of the entry and passage through them of the crossbar 4 and attached shank. It is preferable, however, especially in cases where the parts are fitted or maintained to receive the fastening, that the apertures or openings through them be in length sufficient to permit of an easy passage of the crossbar 4, but in width substantially equal to the width of the shank in order that the shank may fit rather snugly in them. The aperture in the inner one of the parts to be fastened against which the crossbar has bearing is a slot forming aperture such that after the crossbar has been passed through it and afterward turned the crossbar will then span the slot with secure bearing against the inner part.

Arranged upon the shank and associated with the head of the device is a washerlike member 12 and also a spring 13. The member 12 is annular in form, and is provided with a central opening through it through which the shank extends. It presents on its bottom face a flat or seating surface 14 which has bearing against the outer face of the outer one of the parts to be fastened. Co-ordinating with this face is the central opening 15 in the member through which the shank extends. This opening is made but slightly larger than the shank so that the shank may have a snug sliding fit in it. Inasmuch as the wall forming the opening extends at right angles to the bottom or seating face 14 of the member, which has bearing against the outer one of the parts to be fastened, the shank will be held to maintain an upright position with relation to said parts when the device is first applied to them, and during the time, also, when power is being applied to push the shank through the apertures in them. Above the opening 15 in the member 12 the body thereof is recessed to provide a socket 16. The spring 13 is located within the socket 16 with coils extending around the shank, one end of the spring having bearing against the bottom 17 of the socket and the other end of the spring the under side of the head 2. Normally the tension of the spring will be sufficient to have moved the head out of the socket to the limit permitted by the crossbar engaging the under side of the member 12. As the head is depressed, however, the spring will be distorted and the head will enter the socket, and after the head once enters the socket the spring will be entirely concealed. The outer side 19 of the member is made rounding or beveled substantially as shown in order that it may make proper finished co-ordination with the head 2 after the head has entered the socket.

Means are provided for locking the crossbar and preventing it from being turned into a position in alignment with the aperture except upon a positive depression of the shank and crossbar upon application of force to the head of the device. This locking means comprises a keeper 21 taking the form of a lift rising from the central portion of the crossbar on the rear side thereof in line with the shank. The keeper is provided with opposing spaced edges 22, 22 which are separated from one another a distance slightly less than the width of the aperture or slot crossed by the crossbar when in its locking position so that when the crossbar is in this position the keeper will enter said aperture and its opposing spaced edges, engaging the sides of the aperture, will prevent the crossbar from being turned except by pushing the keeper out of the slotted aperture when the crossbar may be turned.

The washerlike member 12 is provided with an annular shoulder or edge 25 against which the head may have bearing engagement when the head has been depressed sufficiently to tension the spring 13, and the head has entered into the socket 16 sufficiently to conceal the spring and have, also, properly finished co-ordination with that outer portion 19 of the member 12 which surrounds and encloses it. The spring 13 need only be a spring of relatively slight tension for the reason, as will presently be explained, that reliance is not placed on the force exerted by the tension of the spring to hold the fastening in positive engagement with the combined parts and the parts snugly together, but only for the purpose of exerting sufficient tension to hold the keeper of the crossbar within the aperture or slot in the inner one of the combined parts when the crossbar on the shank has been turned into a locking position across this aperture or slot upon the application of the fastening device to the parts.

Reliance for obtaining the actual binding together of the parts is laid upon a threaded connection and is effected by turning the shank and head of the device in the manner of a screw. To this end the inner end of the shank on which the crossbar is fitted is provided with a threaded extension 26 and the crossbar is threaded to fit upon this extension. If the crossbar be held fixed the extension may then be turned to extend through the crossbar. The end of the threaded extension, is provided with a shoulder 27 upon its outer end. This shoulder does not interfere with the turning of the extension through the cross bar for assuming the crossbar to be in a fixed position, the turning may be continued until the inner face of the crossbar or keeper engages the lower end of the shank. Upon a reverse turning, however, the threaded extension can be turned out of the crossbar only to the point of the shoulder and, if the turning be further continued the crossbar will turn with the threaded extension and shank.

It will now be assumed that the thread cut on the shank extension 26 is a right-hand thread so that if the crossbar on it be held fixed the threaded shank extension will turn through the crossbar on turning the shank in a clockwise direction. Reversely if the crossbar be held fixed and the shank turned in an anti-clockwise direction the threaded shank extension will be turned out of the crossbar until the shoulder or stop on the end of the extension engages the crossbar.
Further withdrawal of the extension from the crossbar then ceasing, and if the anti-clockwise turning of the shank be continued the crossbar will turn with it and with the threaded extension on which it is fitted. It will further be assumed that the crossbar is turned down into engagement with the shoulder on the end of the threaded shank extension, for this is the preferred initial location of the crossbar preparatory to the application of the fastening device to the parts to be combined.

The fastening operation is as follows:—
The shank and crossbar with it are first passed through the aligned apertures in the respective parts to be combined until the crossbar has passed through and beyond the aperture in the inner one of the parts to be combined. At this time the spring will have become tensioned by the depression of the head of the shank. The head and shank are now turned in an anti-clockwise direction; consequently the crossbar on the threaded end extension of the shank will turn with it and is turned into a locking position crosswise the slotted aperture in the inner one of the combined members. Thereupon pressure upon the head of the shank is released when the tension of the spring will operate to bring the keeper on the crossbar into the slotted aperture holding the crossbar in its locked position. The parts of the fastener are now in the position shown in Fig. 1. With the crossbar then held fixed by the keeper against turning, the head and shank are then turned in a clockwise direction, and thereupon the threaded extension to the shank will turn through the cross bar until the head of the shank is brought into drawing engagement with the shoulder 25 of the member 12, after which if the turning of the head and shank be further continued the cross bar will be drawn tight against the inner one of the combined members or parts, and the parts bound tightly together as the screw is tightened (see Fig. 2). It is unnecessary to move the cross bar down into engagement with the shoulder 27 on the end of the threaded extension before the device is applied to the parts to be fastened, but in such case before the cross bar has been moved entirely through the apertures in the respective parts the head of the shank should be turned in an anti-clockwise direction to bring the cross bar into engagement with the shoulder so that the cross bar may be turned, by the turning of the shank, into a locking position crosswise the slotted aperture in the inner one of the combined parts when the keeper will enter the slot aperture in the inner part for holding the cross bar in place as previously described.

Having thus fully described my invention, I claim and desire to secure by Letters Patent of the United States:

1. In a fastening device for fastening together apertured members, the combination comprising a shank, a head on the shank at one end, a crossbar on the shank at its opposite end, a washerlike member arranged upon the shank beneath the head and adapted to be interposed between said head and the face of the outer one of said apertured members on the application of said fastening device thereto, a spring on the shank beneath the head and between it and said washerlike member, a threaded connection between the crossbar and shank whereby the shank may be turned to extend through the crossbar when the crossbar has been turned to a locking position crosswise the aperture in the inner one of said members and is there held by the tension of said spring, and means connecting the shank and crossbar to turn in unison on a reverse turning of the shank whereby the crossbar may be positioned with relation to the aperture in the inner one of said members by the turning of the shank.

2. In a fastening device for fastening together apertured members, the combination comprising a shank, a head on the shank at one end, a crossbar on the shank at its opposite end, a washer like member arranged upon the shank beneath the head and adapted to be interposed between said head and the face of the outer one of said apertured members on the application of said fastening device thereto, said washer-like member having a central opening in it through which the shank extends, a socket above said opening and an edge against which said head will have bearing when moved down, a spring on the shank beneath the head and between it and said washerlike member, a threaded connection between the crossbar and shank whereby the shank may be turned to extend through the crossbar when the crossbar has been turned to a locking position crosswise the aperture in the inner one of said members and is there held by the tension of said spring, and means connecting the shank and crossbar to turn in unison on a reverse turning of the shank whereby the crossbar may be positioned with relation to the aperture in the inner one of said members by the turning of the shank.

WILLIAM H. J. FITZGERALD.